United States Patent
Roberts et al.

(10) Patent No.: US 10,471,825 B2
(45) Date of Patent: *Nov. 12, 2019

(54) CARRIER BEARING ASSEMBLY

(71) Applicant: Sandcraft LLC, Glendale, AZ (US)

(72) Inventors: Jonathan D. Roberts, Glendale, AZ (US); Brent G. Reynolds, Phoenix, AZ (US)

(73) Assignee: Sandcraft, LLC, Glendale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,219

(22) Filed: Jan. 9, 2018

(65) Prior Publication Data

US 2018/0141434 A1 May 24, 2018

Related U.S. Application Data

(63) Continuation-in-part of application No. 15/449,483, filed on Mar. 3, 2017, now Pat. No. 9,862,269, which
(Continued)

(51) Int. Cl.
*B60K 17/24* (2006.01)
*F16C 35/06* (2006.01)
(Continued)

(52) U.S. Cl.
CPC ............ *B60K 17/24* (2013.01); *F16C 35/042* (2013.01); *F16C 35/047* (2013.01); *F16C 35/06* (2013.01);
(Continued)

(58) Field of Classification Search
CPC ...... F16C 35/042; F16C 35/047; F16C 35/06; F16C 35/07; B60K 17/22; B60K 17/24
See application file for complete search history.

(56) References Cited

U.S. PATENT DOCUMENTS 2,620,244 A * 12/1952 Beatty, Jr. ............. F16C 23/084
384/498
2,705,161 A 3/1955 Shafer
(Continued)

FOREIGN PATENT DOCUMENTS

DE 2908709 9/1980

OTHER PUBLICATIONS

Polaris OEM part No. 3515075.
The product UCP206, including listings for sale (2018) and shown by catalog.

*Primary Examiner* — James Pilkington
(74) *Attorney, Agent, or Firm* — Booth Udall Fuller, PLC

(57) ABSTRACT

A carrier bearing assembly can include a bracket comprising a first end, a second end, a first face extending between the first end and the second end width, and a second face opposite the first face. An opening can be formed completely through the bracket and extend from the first face to the second face. A bearing can be disposed within the opening and an angle between a centerline of the bearing and a centerline of the bracket can be in a range of 85-89° or 91-95°. First and second mounting structures offset from the opening can be for coupling the carrier bearing assembly to the frame of the UTV, and the centerline of the bracket can pass through a center of the first mounting structure and a center of the second mounting structure.

19 Claims, 9 Drawing Sheets

Related U.S. Application Data is a continuation-in-part of application No. 14/952,741, filed on Nov. 25, 2015, now Pat. No. 9,956,872.

(51) Int. Cl.
*F16C 35/067* (2006.01)
*F16C 35/04* (2006.01)
F16C 33/66 (2006.01)
F16C 19/06 (2006.01)

(52) U.S. Cl.
CPC .......... *F16C 19/06* (2013.01); *F16C 33/6622* (2013.01); *F16C 35/067* (2013.01); *F16C 2326/06* (2013.01)

(56) References Cited

U.S. PATENT DOCUMENTS

| | | | |
|---|---|---|---|
| 3,003,831 A * | 10/1961 | King | B60K 17/24 |
| | | | 180/381 |
| 3,295,801 A | 1/1967 | McDowall et al. | |
| 3,446,542 A * | 5/1969 | Whitehurst | F16C 23/084 |
| | | | 384/477 |
| 3,501,940 A * | 3/1970 | Moore | B21D 53/10 |
| | | | 470/163 |
| 3,981,550 A | 9/1976 | Zimmer et al. | |
| 4,421,187 A | 12/1983 | Shibata | |
| 4,648,475 A | 3/1987 | Veglia | |
| 4,652,011 A | 3/1987 | Hollerweger | |
| 5,172,985 A | 12/1992 | Constancio | |
| 5,208,981 A | 5/1993 | Puzsik | |
| 5,975,573 A | 11/1999 | Belleau | |
| 7,841,606 B2 | 11/2010 | Rey | |
| 7,901,142 B2 | 3/2011 | Mathis | |
| 8,070,365 B2 | 12/2011 | Hoppert | |
| 8,132,640 B2 | 3/2012 | Heitkamp et al. | |
| 8,454,039 B2 | 6/2013 | Murakami | |
| 8,544,591 B2 | 10/2013 | Felchner | |
| 9,193,377 B2 | 11/2015 | Pavuk | |
| 9,254,743 B2 | 2/2016 | Yoo | |
| 9,366,294 B2 | 6/2016 | Kim | |
| 9,382,968 B2 | 7/2016 | Paulson | |
| 2003/0236122 A1 | 12/2003 | Blumke | |
| 2004/0011584 A1 | 1/2004 | Henkel | |
| 2009/0211386 A1 | 8/2009 | Hayes | |
| 2009/0214149 A1 | 8/2009 | Hoppert | |
| 2010/0065364 A1 | 3/2010 | Felchner et al. | |
| 2010/0289238 A1 | 11/2010 | Archer | |
| 2012/0248724 A1 | 10/2012 | Watanabe | |
| 2015/0093062 A1 | 4/2015 | Kim | |
| 2015/0167744 A1 | 6/2015 | Yoo | |
| 2017/0174077 A1 | 6/2017 | Roberts | |

* cited by examiner

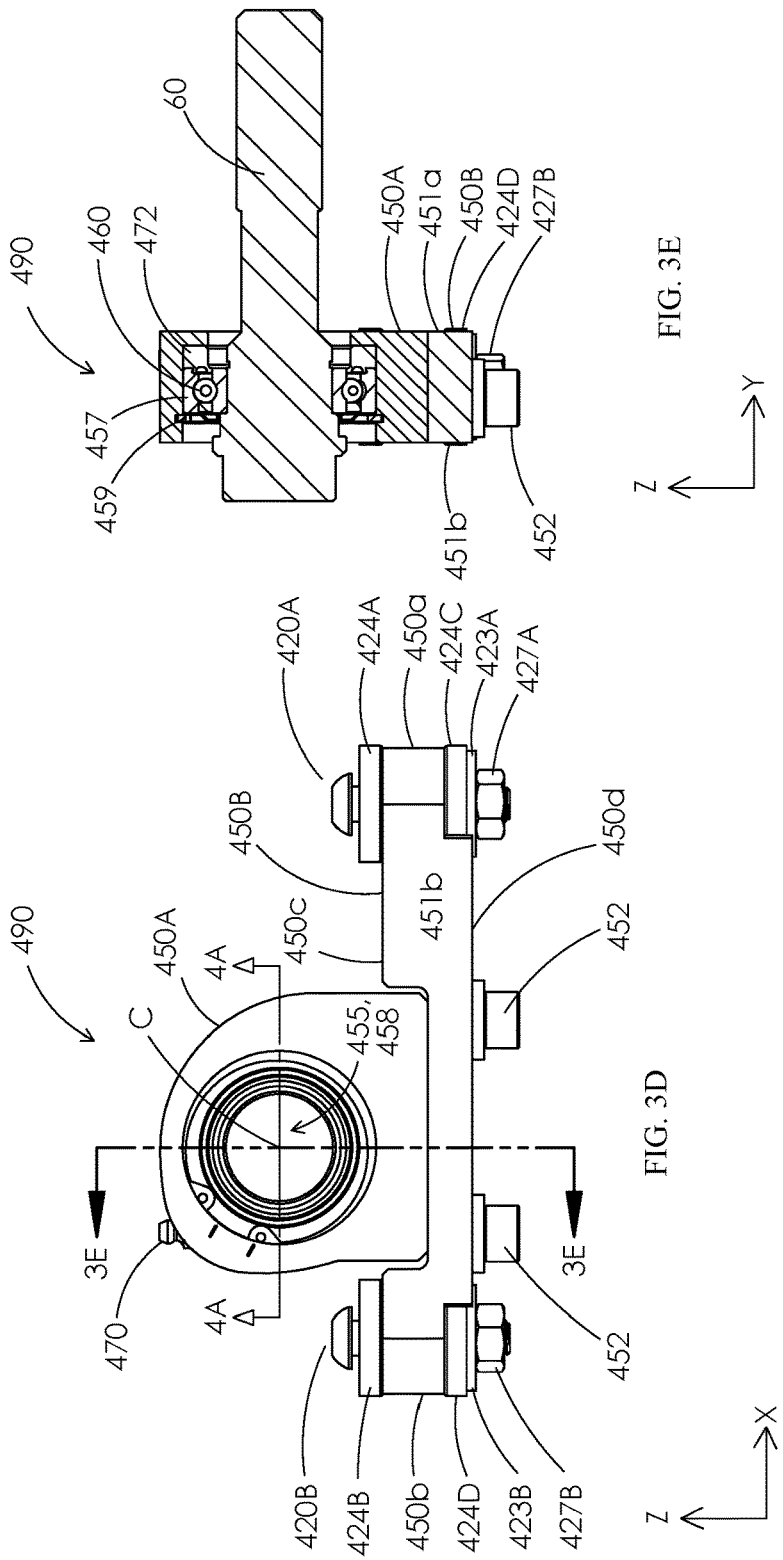

CARRIER BEARING ASSEMBLY

RELATED APPLICATIONS

This application is a continuation-in-part of U.S. patent application Ser. No. 15/449,483, filed Mar. 3, 2017 titled "Carrier Bearing Assembly," which application is a continuation-in-part of U.S. patent application Ser. No. 14/952,741, filed Nov. 25, 2015 titled "Carrier Bearing Assembly," the entirety of the disclosures of which is hereby incorporated by this reference.

TECHNICAL FIELD

The present disclosure relates to bearings generally, and to ball bearings such as those used for carrier bearing assemblies.

BACKGROUND

A universal joint (U-joint) is a type of coupling that can be attached to a shaft to allow the shaft to rotate and transmit rotational motion in other than a straight line, such as by coupling together multiple shaft segments that allows the segments shaft to bend, turn, or accommodated nonlinear paths while transmitting torque, rotary motion, or both between the shaft segments and opposing ends of the shaft. Rotating shafts or elements transmitting torque are present in many applications, and are also in use in vehicles, such a automobiles, trucks, tractors, machinery, and equipment. For example, on vehicles where the engine is located on a different end from the drive wheels, such as on rear-wheel drive trucks, and on many 4-wheel drive vehicles, a driveshaft is used transfer torque from the engine and transmission to the drive wheels. To permit variations in alignment, a driveshaft typically incorporates several universal joints (U-joints).

FIG. 1 illustrates the concept of operating angles of a shaft having multiple U-joints. As shown in FIG. 1, a first shaft segment 1 is coupled to a second shaft segment 2 using a first U-joint A, and the second shaft segment 2 is coupled to a third shaft segment 3 using a second U-joint B. As illustrated, each shaft segment is coupled to another at an angle, called the operating angle. For instance, the operating angle between the first shaft segment 1 and the second shaft segment 2 is a degrees (a°) and the operating angle between the first shaft segment 2 and the third shaft segment 3 is b degrees (b°). It is known in the art that when U-joints are used to accommodate operating angles a° and b° and the operating angles a° and b° are the same, the rotational speed of the first shaft segment 1 and the third shaft segment 3 will also be the same. Additionally, when the operating angles a° and b° are the same and the first shaft segment 1 is rotated at a constant rate, the third shaft segment 3 will also rotate at a constant rate.

SUMMARY

A need exists for an improved carrier bearing assembly. Accordingly, in an aspect, a carrier bearing for attaching to a frame of a utility terrain vehicle (UTV) can comprise a bracket comprising a first end, a second end, a width extending between the first end and the second end, a first face extending between the first end and the second end along the width, and a second face opposite the first face extending between the first end and the second end along the width of the bracket. An opening can be formed completely through the bracket and extend from the first face to the second face. A bearing can be disposed within the opening with an auto set angle between a centerline of the bearing and a centerline of the bracket being in a range of 85-89° or 91-95°. A first mounting structure can be offset from the opening for coupling the carrier bearing assembly to the frame of the UTV. A second mounting structure can be offset from the opening for coupling the carrier bearing assembly to the frame of the UTV. The centerline of the bracket can pass through a center of the first mounting structure and a center of the second mounting structure. The auto set angle can be determined by at least one slotted opening formed in the bracket such that the centerline of the bearing moves relative to the centerline of the bracket.

The carrier bearing assembly can further comprise the first mounting structure comprising a first opening through the bracket and a first bolt disposed through the first opening, the first bolt being adapted to be aligned with a first hole in the frame of the UTV, and the second mounting structure comprising a second opening through the bracket and a second bolt disposed through the second opening, the second bolt being adapted to be aligned with a second hole in the frame of the UTV. A center of the first mounting structure can be defined by a center of the first bolt, and a center of the second mounting structure is defined by a center of the second. The first opening of the first mounting structure can be formed as at least one of the at least one slotted openings. The at least one slotted opening can comprise an elongate, plus, circular, or square shape, and a cross-sectional area of the slotted opening can be greater than or equal to 1.2 times a cross-sectional area of the first bolt. The bracket can comprise an upper unitary machined bracket component comprising the opening and the bearing. The lower unitary machined bracket component can comprise the first opening through the bracket with the second bolt disposed through the second opening, and the second opening through the bracket and the second bolt disposed through the second opening. The at least one slotted opening formed in the bracket can be in addition to the first opening of the first mountings structure and the second opening of the second mounting structure, the at least one slotted opening being disposed within a common footprint of the upper unitary machined bracket and the lower unitary machined bracket. A rubber bushing can be configured to be disposed between the bracket and the frame of the UTV.

In another aspect, a bearing assembly for attaching to a frame of a UTV can comprise a bracket comprising a first end, a second end, a width extending between the first end and the second end, a first face extending between the first end and the second end along the width, and a second face opposite the first face extending between the first end and the second end along the width of the bracket. An opening can be formed completely through the bracket and extending from the first face to the second face. A bearing disposed within the opening and an angle between a centerline of the bearing and a centerline of the bracket being in a range of 85-89° or 91-95°. A first mounting structure offset from the opening for coupling the carrier bearing assembly to the frame of the UTV, and a second mounting structure offset from the opening for coupling the carrier bearing assembly to the frame of the UTV. The centerline of the bracket passing through a center of the first mounting structure and a center of the second mounting structure.

The greasable bearing assembly can further comprise the first mounting structure comprising a first opening through the bracket and a first bolt disposed through the first opening, the first bolt being adapted to be aligned with a first hole in the frame of the UTV. The second mounting structure can comprise a second opening through the bracket and a second bolt disposed through the second opening, the second bolt being adapted to be aligned with a second hole in the frame of the UTV. A center of the first mounting structure can be defined by a center of the first bolt, and a center of the second mounting structure is defined by a center of the second bolt. The first opening of the first mounting structure can be formed as a slotted opening. The slotted opening can comprise an elongate, plus, circular, or square shape, and a cross-sectional area of the slotted opening can be greater than or equal to 1.2 times a cross-sectional area of the first bolt. The bracket can comprise an upper unitary machined bracket component comprising the opening and the bearing, and a lower unitary machined bracket component comprising the first opening through the bracket with the second bolt disposed through the second opening, and the second opening through the bracket and the second bolt disposed through the second opening. A slotted opening can be formed in the bracket within a common footprint of the upper unitary machined bracket and the lower unitary machined bracket. The carrier bearing can be fastened over or under the frame of the UTV.

In another aspect, a carrier bearing assembly for attaching to a frame of a UTV can comprise a bracket comprising a first end, a second end, a width extending between the first end and the second end, a first face extending between the first end and the second end along the width, and a second face opposite the first face extending between the first end and the second end along the width of the bracket. An opening can be formed completely through the bracket and extend from the first face to the second face. A bearing can be disposed within the opening. At least one mounting structure can couple the carrier bearing assembly to the frame of the UTV. The bracket can further comprise an auto set angle determined by at least one slotted opening formed through the bracket and configured to allow the bracket to move, slide, or rotate at an angle relative to the frame of the UTV and relative to original bolt holes in the frame of the UTV for receiving a stock carrier bearing assembly.

The carrier bearing can further comprise the at least one mounting structure comprising a first bolt adapted to be aligned with a first hole in the frame of the UTV, and a second bolt disposed through the second opening, the second bolt being adapted to be aligned with a second hole in the frame of the UTV. A centerline of the bracket can pass through a center of the first bolt and a center of the second bolt such that the auto set angle is measured between a centerline of the bearing and a centerline of the bracket at an angle less than 89° or greater than 91°. The auto set angle can be in a range of 85-89° or 91-95°. The bracket can comprise an upper unitary machined bracket component comprising the opening and the bearing, and a lower unitary machined bracket component can comprise openings through which the first bolt and the second bolt are disposed. One or more of the at least one slotted openings can be formed in the bracket within a common footprint of the upper unitary machined bracket and the lower unitary machined bracket. A rubber bushing can be configured to be disposed between the bracket and the frame of the UTV.

BRIEF DESCRIPTION OF THE DRAWINGS

FIGS. 3A-3H illustrate various views of an embodiment of a carrier bearing assembly.

DETAILED DESCRIPTION OF THE INVENTION

Figure 1:
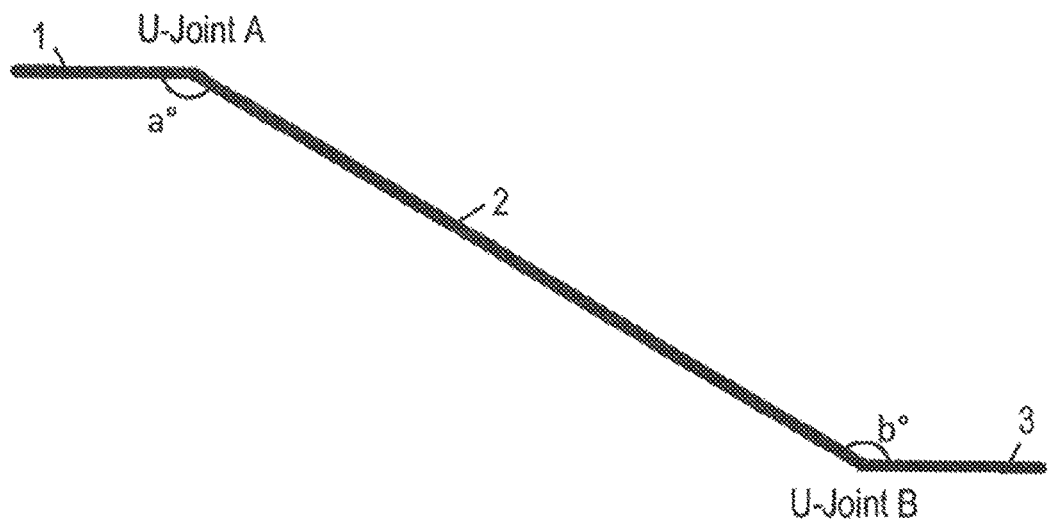
FIG. 1 is a diagram illustrating operating angles of a bent shaft having universal joint (U-joint) couplings.

This disclosure, its aspects and implementations, are not limited to the specific material types, or other system component examples, or methods disclosed herein. Many additional components, manufacturing and assembly procedures known in the art consistent with its manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in different forms, there is shown in the drawings and will herein be described in detail, particular embodiments. As such, the disclosure is presented with the understanding that the disclosure is to be considered as an exemplification of the principles of the disclosed structures, methods, and systems, and is not intended to limit the broad aspect of the disclosed concepts to the embodiments illustrated.

With reference to the conventional structure show in FIG. 1, Applicant has additionally observed that when the operating angles a° and b° are about the same, the rotational speed of the first shaft segment 1 and the third shaft segment 3 will also be about the same. Similarly, when the operating angles a° and b° are about the same and the first shaft segment 1 is rotated at a constant rate, the third shaft segment 3 will also rotate at a constant rate. However, where the operating angles a° and b° are different, a rate or rotation or angular velocity for the first shaft segment 1 and the third shaft segment 3 will be different. For example, if the first shaft segment 1 rotates with a first angular velocity, then with operating angles a° and b° being different, the angular velocity of the third shaft segment 3 will be different than the rate of rotation or angular velocity of the first shaft segment 1. As a result, as the angular velocity of the first shaft segment 1 varies, the angular velocity of the third shaft segment 3 will also vary and will be continually accelerating/decelerating according to the changes in the angular velocity of the first segment. When the differences in operating angles a° and b° are significant, such as greater than or equal to 1 degree or 2 degrees, the corresponding differences in angular velocity are also significant, then as a result, Applicant has observed that vibrations result in the first, second, and third shaft segments 1, 2, and 3, respectively. The vibrations in the shaft segments can undesirably introduce dynamic loading, stresses, and strains on vehicle components, including all of the driveline components, which can cause early or premature failure on vehicle components, as well as reduced efficiency in vehicle performance, and make operation of the vehicle less smooth and less comfortable.

Figure 2:
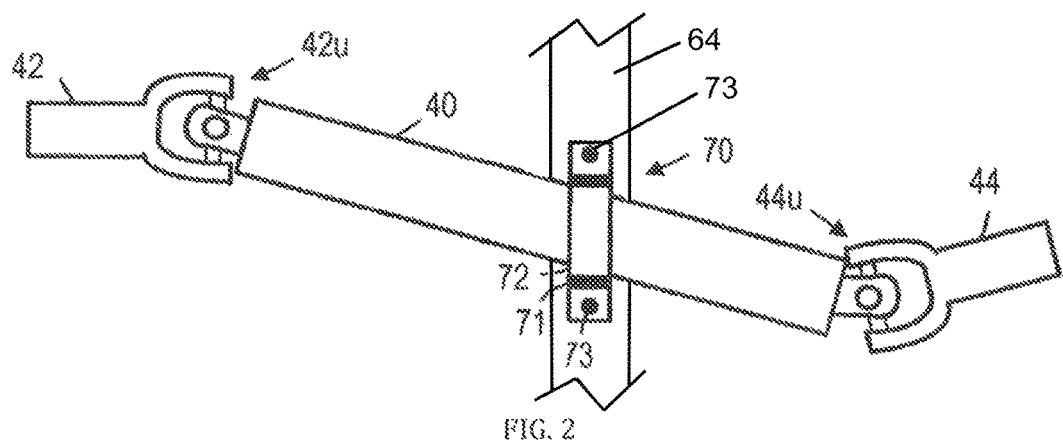
FIG. 2 illustrates a driveshaft of a vehicle with non-optimally aligned U-joints employing a conventional carrier bearing assembly.

FIG. 2 illustrates a driveshaft comprising a first shaft segment 42, a second shaft segment 40, and a third shaft segment 44, similar to the shaft segments shown and described with respect to FIG. 1. However, FIG. 2 shows the shaft segments and U-joints in additional detail, rather than only diagrammatically as shown in FIG. 1. The shaft segments in FIG. 2 are shown with unequal or non-optimal operating angles between the first shaft segment 42 and the second shaft segment 40, as well as between the second shaft segment 40 and the third shaft segment 44. While the driveshaft shown in FIG. 2 has, for convenience, been illustrated to show two U-joints, 42*u* and 44*u*, additional U-joints could also be included. It is also to be realized that for illustrative purposes the operating angles shown are exaggerated. As depicted, segment 42 is attached to segment 40 via U-joint 42*u*, and segment 40 is attached to segment 44 via U-joint 44*u*. In some instances, the first shaft segment can be coupled to a vehicle engine/transmission, and the third shaft segment 44 can be coupled to drive wheels of a vehicle, such as through a rear wheel differential. Between the engine/transmission and the drive wheels, the shaft, such as the second shaft segment 40 can be coupled to a frame, vehicle frame, chassis, or utility terrain vehicles or universal task vehicles (UTV) frame or chassis 64 of the vehicle, such as with a carrier bearing 70, to provide support and to carry weight of the shaft or one or more segments of shaft, such as the second shaft segment 40. As used herein, a UTV may comprise utility terrain vehicles, a universal task vehicles, a four-wheel drive vehicle, two-wheel drive vehicle, a sandrail, dune buggy, all-terrain vehicle (ATV), truck, off-road vehicle, sport utility vehicle, recreational vehicle, defense vehicle, race vehicle, competition type vehicle, or other similar vehicle, whether or not the vehicle is street legal, and whether the vehicle is powered by gasoline combustion engines, pre-detonation or diesel engines, or other engines using propane, natural gas, or any other fuel, as well as vehicles powered by electric motors.

The carrier bearing 70 can be mounted to the frame or chassis 64 of the vehicle using bolts 73, with the second shaft segment 40 of the driveshaft passing through the carrier bearing 70. Applicant has noted that in conventional arrangements, carrier bearings 70 are conventionally formed with the opening or hole through the bearing housing being perpendicular, as a straight 90° angle, to the opposing faces of the carrier bearing housing. However, when the operating angles of the U-joints 42*u* and 44*u* are significantly different or markedly apart, such as with differences of angles, including more that 1 degree of difference, or 2 degrees of difference, and including angles greater than 0 degrees or in a range of 1-15 degrees, the driveshaft will tend to vibrate excessively. In some UTVs, such as the Polaris RZR 1000, both 2-seat (2S) and 4-seat versions (4S), the Polaris Turbo RZR, both the 2S and the 4S version, as well as other UTVs, Applicant has observed that the driveshaft or portions thereof, such as the second shaft segment 40, which is coupled to the carrier bearing 70, will be able to move up or down, in a vertical direction (between the ground and the frame 64 of the vehicle) on the order of 2.5 centimeters (cm) (i.e. about 1 inch (in.)) or more during travel of driving of the vehicle, where the vertical movement is measured as change in vertical position of the second shaft segment 40, such as at ends of the second shaft segment 40 where the U-joints 42*u* and 44*u* are coupled. Such vertical movement or displacement can cause excessive and even extreme vibration, loud noise, and undesired stress and wear to the driveshaft, surrounding components, and performance of the vehicle.

Applicant has noted that the movement and vibration of the second shaft segment 40 occurs as the second shaft segment 40 passes through the bearing 70 at a non-perpendicular angle to the hole or opening through the carrier bearing housing, as well as a non-perpendicular angle to the bearing 71 itself. Although the carrier bearing 70 somewhat constrains movement of the driveshaft, a sizeable gap 72 can exist between the second shaft segment 40 and the bearing 71 of the carrier bearing 70. To reduce stress on the driveshaft (segments 40, 42, 44) and to remedy these problems of vibration, movement or play of the driveshaft 40, and the gap between the second shaft segment 40 and the carrier bearing 70 or bearing 71, a rubber ring is sometimes fitted onto the bearing 70, such as between the housing of the carrier bearing 70 and the bearing 71. The rubber ring for the OEM carrier bearing 70 is toroidal in shape (like a big rubber donut) and is a generic or universal part for conventional driveline. The OEM rubber ring allows the relative operating angle of the driveshaft segment 40 and the carrier bearing 70 to move relative to one another, such as up, down, left, and right, or in any direction in the plane defined by the carrier bearing 70. As such, the OEM rubber ring and the carrier bearing 70 do not address the issues of different rates of rotation, stress, and undesirable vibration, and to the contrary, actually allows for increased movement of the driveshaft, which in turn increases the movement, vibration, and stress, each of which can increase the problems identified by Applicant.

According to, and consistent with, Applicant's new observations and insights, Applicant has created new and improved carrier bearing assembly that is presented herein. The carrier bearing decreases unequal operating angles on universal joints, which in turn can attenuate or reduce differences in rotational speed of driveline components and allow drivelines to spin and or rotate at a same, or nearly a same, speed or angular velocity to reduce unwanted vibration, stress, and driveline failures. By matching or nearly matching operating angles among driveline components, which can in turn dictate rotational mass and spinning speeds, and amount of wear or binding in driveline components or rotational parts can be reduced. By decreasing the compounding operating angles in the driveline, the driveline can operate in a more natural and less irregular way, thereby reducing premature wear on driveline components.

Applicant's carrier bearing will also reduce wear on the rear transmission, including both the output shaft and the internal gears, bearing, and other internal transmission components, by decreasing the operating angle at the point of drive force. The improved carrier bearing allows the universal joints to spin and rotate more freely than with a conventional driveline assembly, and without the binding that causes premature wear, thereby increasing the life of driveline components, including driveline components subject to rotational forces during normal operation. Applicant's fixed relative position and non-perpendicular angle between the carrier bearing and drives shaft, without the excessive shifting permitted and facilitated by OEM rubber O rings, remedies the issues present with the prior art including different rates of rotation for driveline segments based on unequal angles, undesirable vibration, and the resulting stress applied to driveline members and vehicle components.

FIGS. 3A-3E illustrate various views of an embodiment of a carrier bearing assembly 490. The carrier bearing assembly 490 includes a height H that extends in a vertical or z-direction, a width W that extends in a horizontal, lateral, or x-direction such as between left and right sides of the vehicle or in a direction extending between doors of the vehicle, and a length L that is perpendicular to the height and width and extends along a length of the vehicle, such as between the front and back of the vehicle.

Figure 3A:
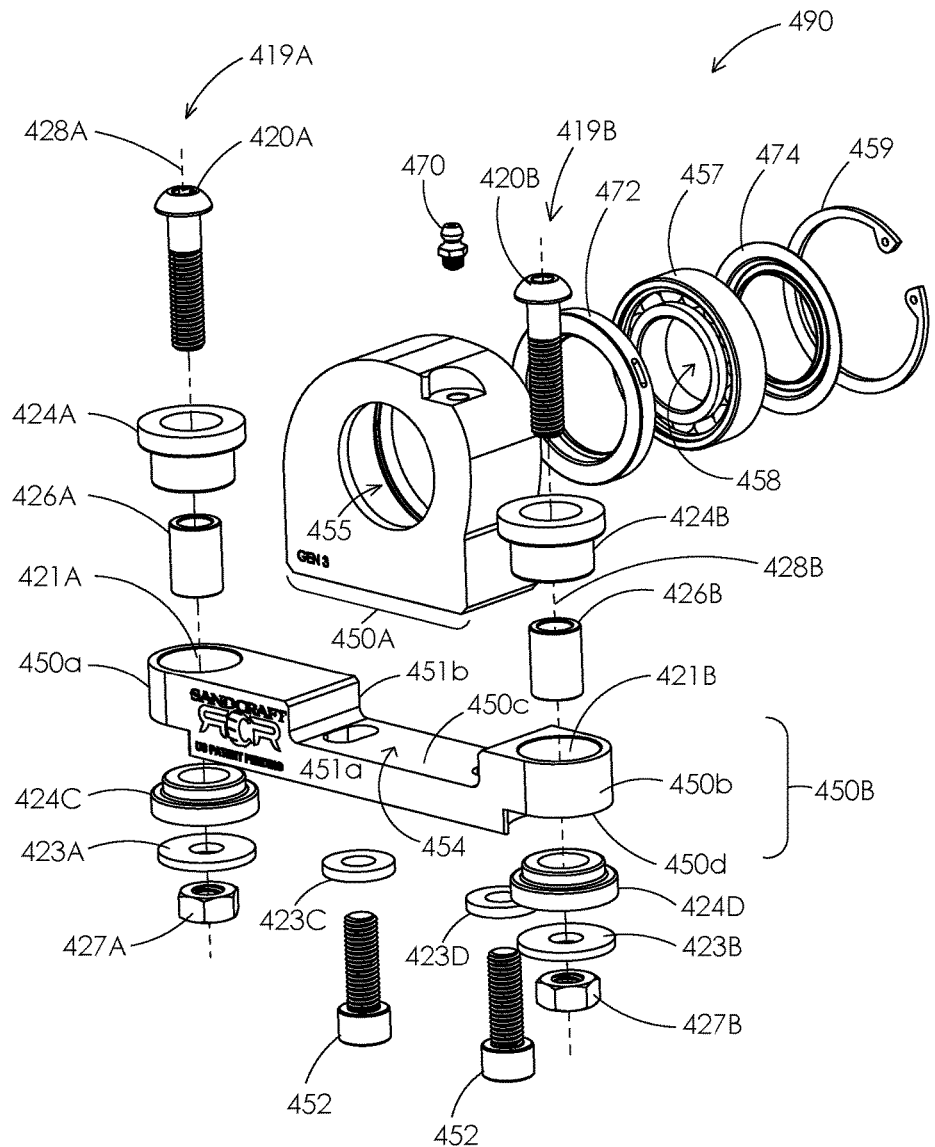

FIG. 3A shows an exploded perspective view of the carrier bearing assembly 490, with the front face 451a oriented toward the viewer. FIG. 3A shows the carrier bearing assembly 490 includes a bracket 450 that can be constructed from a strong, durable, and tough material such as metal, including steel, aluminum, aluminum composite, and other suitable materials. The bracket 450 can be formed of a single, unitary, or modular pieces. In other instances, the bracket 450 can be formed of one or more pieces, such as first or upper integrally formed or machined bracket component 450A, and second or lower integrally formed or machined bracket component 450B. The bracket 450 can be cast, formed, carved, machined, or formed in any other suitable way. The bracket 450 can be formed of a single material or multiple materials, including alloys, and with a desired finish, plating, or treatment. The upper bracket component 450A may be disposed above the lower bracket component 450B to be rigidly coupled to the lower bracket 450B with any suitable attachment device or method including welding, adhesive, or with mechanical fasteners or threaded bolts 452.

Figure 6:
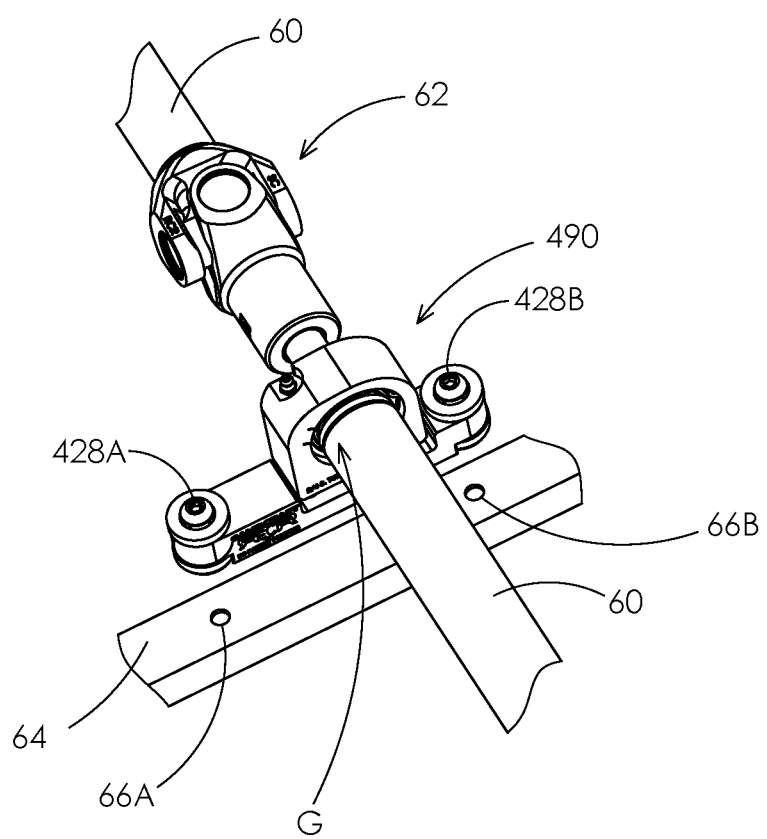
FIG. 6 illustrates a carrier bearing assembly coupled to a driveshaft and frame.

The bracket 450 can be coupled, attached, or bolted to the frame 64 of a vehicle or UTV, such as the Polaris RZR 1000, using fastener members 419A and 419B, which can comprise bolts 420 and bolt holes 421 as well as washers 423, bushing pairs 424/425, bushings 426, and nuts 427 as shown, e.g., in FIGS. 3A and 6. When replacing an original carrier bearing assembly, the bolts 420A and 420B can screw into the original carrier bearing mounting holes 66A, 66B, respectively, so that the position of the original carrier bearing 70 and the new carrier bearing 490 is the same with respect to the frame 64 of the vehicle and the driveshaft 60 of the vehicle. As shown, the carrier bearing assembly 490 can include a bearing 457, and a driveshaft opening or hole 458 in the bearing 457, through which the driveshaft 60 of the vehicle can pass through. The original equipment manufacturer (OEM) carrier bearings, such as carrier bearing 70, are generally symmetrical about the bearing, so that the opening for receiving the driveshaft is at the center of the carrier bearing, the center of the bracket, the center between the two bolt holes in the OEM carrier bearing 70 (e.g. equidistantly spaced between the two bolt holes), or the center of the bolt holes in the frame 64. The centered bearing opening in the OEM bearing 70 can increase the operating angle of the driveshaft with respect to the bearing 70, due to the alignment between a rear transmission and a front differential or gear case of the UTV. The increased operating angle of the driveshaft and the bearing 70 can also increase or magnify the driveline vibration issue. On the other hand, the opening 458 and the bearing 457, as well as the opening 455 in the bracket 450, can be offset, or laterally offset in an x-direction or along a width of the bracket 450, so that the center of the opening 458 is offset from a center of the bracket 450. Stated another way, when the bolts 420A and 420B are offset an equal or same distance from opposing ends of the bracket 450, the centerline CL of the circular openings 455, 458 can be closer to one bolt 420 (or mounting structure 419) than the other, such as closer to the bolt 420A than the bolt 420B.

Figure 3B:
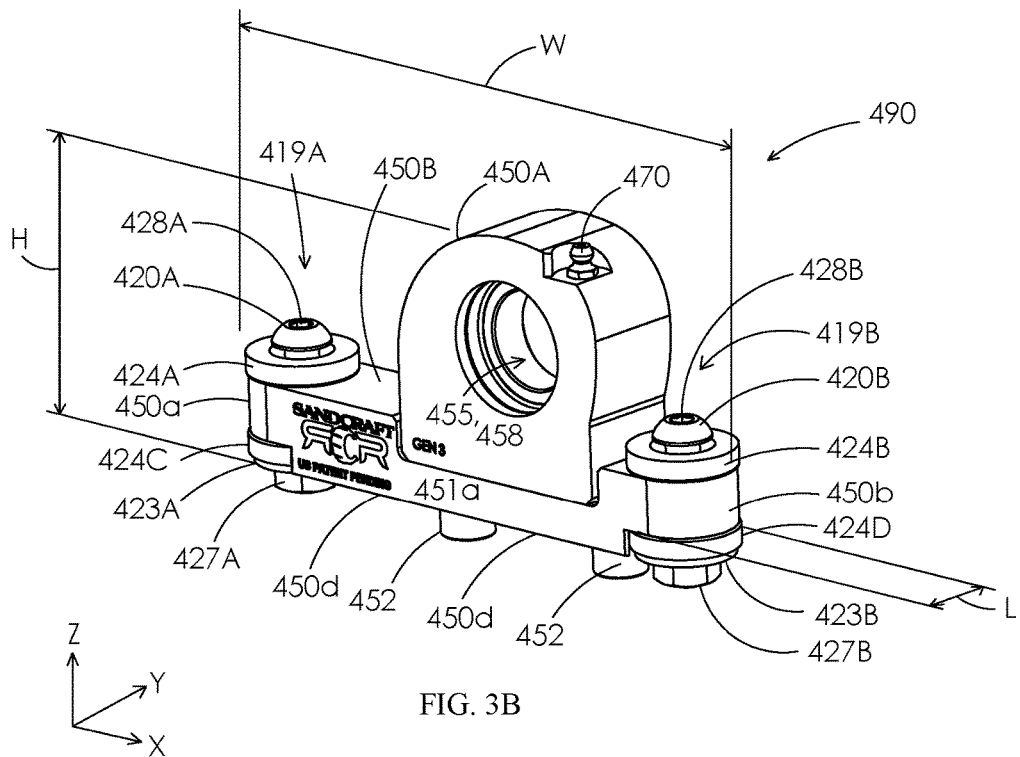

The fastener members or the mounting structures 419 can be used to couple, secure, or bolt the carrier bearing assembly 490 to the frame 64 and can comprise any desirable mechanical or chemical fasteners including nuts and bolts, rods, pegs, clamps, welding, rivets, pins, screws, adhesives, or other suitable devices, such as bolts 420A 420B, which can be at least one bolt or at least two bolts. In some instances, two bolts 420A 420B can be used, and the bolts can extend through the bracket 450 from a top side 450c to a bottom side 450d of the bracket 450 (or in some instances from the bottom side to the top side) so as to attach the bracket 450 to corresponding mounting holes 66A, 66B in the frame 64. In other instances, instead of mounting holes 66A 66B in the frame 64, the frame 64 can comprise one or more bolts, threaded portions, or other structure that extend from the frame 64 into the bolt holes 421A, 421B in the bracket 450. In yet other instances, instead of bolt holes 421A, 421B being formed, or extending into the bracket 450, one or more bolts, threaded portions, or other structure can be integrally formed or permanently attached to the body 450 without using bolt holes 421A, 421B, or without having bolt holes 421A, 421B formed in the body 450, so that the bolts, threaded portions, or other structures extend from the body 450 and can be coupled to the holes 66A and 66B in the frame 64. In some instances, the bolts 420A, 420B may be attached to the mounting holes 66A, 66B used by the OEM carrier bearing 70, as shown in FIG. 3B, thereby eliminating additional time and expense that could be incurred with the use of other arrangements or fastener members 419, as described above. The bracket 450 can be mounted to the vehicle frame or chassis 64 in a method that allows a small amount of compliance at each fastening location (both bolts 420A 420B) to account for manufacturing variation in the OEM vehicle frame 64, or different vehicle frames.

The mounting structure used to mount the carrier bearing assembly 490 onto the vehicle frame 64 may comprise two bolts, bolts 420A, 420B and corresponding stepped bushing pairs 424A/425A and 424B/425B, respectively. The bolts 420A, 420B may be disposed in bolt holes 421A, 421B, each of the bolts being offset the same, or about the same, distance from respective first end edge 450a, and second end edge 450b, of a top side 450c and a bottom side 450d of the bracket 450. Additional views of bolt holes are shown, e.g., in FIGS. 5A-5E. The bolts 420A and 420B can be grade 10.9, for example. Additionally, bushings 426A, 426B and washers 423A, 423B can be employed. The stepped bushings 424A/B and 425A/B may provide additional compliance between the bracket 450 and the vehicle frame 64 to account for manufacture variation and vibration. The stepped bushings 424A/B and 425A/B may be constructed of vibration absorbing material such as rubber. In the illustrated embodiment, the bolt 420A and corresponding bushings are longer than the bolt 420B and corresponding bushings. However, it is to be understood that the lengths of the mounting components may vary depending on the vehicle to which the bracket 450 will be mounted, as well as other design choices. Additionally, it is to be noted that the bushings 425A/426A and 425B/426B can also be used to raise the bracket a predetermined distance from the original position of the OEM carrier bearing assembly.

FIG. 3A also shows the bearing 457 which can be friction fit or press fit into bracket opening 455, and additionally retained using a retaining ring 459 or the like. The bearing 457 can also contain friction-reducing elements, such as ball or roller bearings. Vibration-damping elements such as a rubber ring adjacent the bearing 457 can be incorporated into the design, if desired.

FIG. 3A additionally shows bearing shields 472 and 474 that can be disposed against or adjacent opposite sides of bearing 457 when the bearing and the bearing shields 472, 474 are disposed within the opening 455 in the bracket 450. The bearing shields 472, 474 can be made of metal, rubber, or other suitable material, and can keep trash, foreign debris, and undesired materials from contacting, contaminating, or harming the bearing 457. The bearing shields 472, 474 can also keep or maintain a lubricant or grease within or adjacent the bearing 457, thereby providing additional protection to the bearing 457 from outside contamination. The additional protection can extend to off road conditions, including driving into water, muddy conditions, or other high contamination environments, where additional lubricant can provide protection beyond what would be provided by conventional or sealed OEM carrier bearings 70. While the conventional sealed bearings can be desirable for street use, Applicant has discovered the added benefit from the additional protections from bearing shields 472, 474 and the additional lubricant that can reduce or prevent failure resulting from inadequate protection for the bearing.

FIG. 3A shows the bracket 450 can comprise bushing pairs 424A/424C and 424B/424D that can be similar or identical to what is shown. In other instances, the bushings 424A and 424B can be used in isolation, without a corresponding bushing pair such as 424C and 424D, respectively. Similarly, the carrier bearing assembly 490 can also optionally comprise washers 423C and 423D, similar to washers 423A and 423B.

Furthermore, the carrier bearing assembly 490 can comprise an auto set angle between the bearing 457 and the bracket 450, or between the upper bracket 450A and the lower bracket 450C. Additional explanation of the auto set angle is described below with respect to FIGS. 3F-5F.

An additional and advantageous feature of the carrier-bearing 490 is that the zerk, grease fitting, or grease nipple 470 for feeding lubricants, such as grease into the bearing 457, using, e.g., a grease gun can allow the bearing 457 to be greased while in use, such that the bearing need not be removed or disassembled to be greased.

Greasing and operation of the bearing 457 within the carrier bearing assembly 490 can be facilitated by bearing shields or seals 472, 473, and 474 that can be either a custom bearing shield or seal 473 or a stock or off the shelf shield or seal 472, depending on the particular bearing 457, driveshaft 60, and other relevant components or considerations. In any event, the carrier bearing 490, or features thereof, can be used with any of the UTVs described herein, including both 2 seat and 4 seat RZRs such as RZR 1000 Turbos, to improve performance and operation for the UTV.

FIG. 3B shows an example of a non-exploded perspective view of the carrier bearing assembly 490, similar to the view of the carrier bearing 490 shown in FIG. 3A. The carrier bearing assembly 490, with the front face 451a oriented toward the viewer, and with the upper bracket component 450A rigidly coupled to the lower bracket component 450B with mechanical fasteners or threaded bolts 452. As a non-limiting example, a height H of the bracket 450 can comprise 8.59 cm (3.38 in.), or about the same, where about as used with respect to the H, W, and L, is within a percent difference of 50% or less, 40% or less, 30% or less, 20% or less, or 10% or less. A width W of the bracket 450 can comprise about 18 cm or 18.4 cm (about 7 in. or 7.23 in.), while a width from the centers of the bolt holes 421A, 421B can be 15.20 cm (5.984 in.), or about the same. A length L of the bracket 450 can comprise 3.18 cm (1.25 in.) or about the same.

Figure 3C:
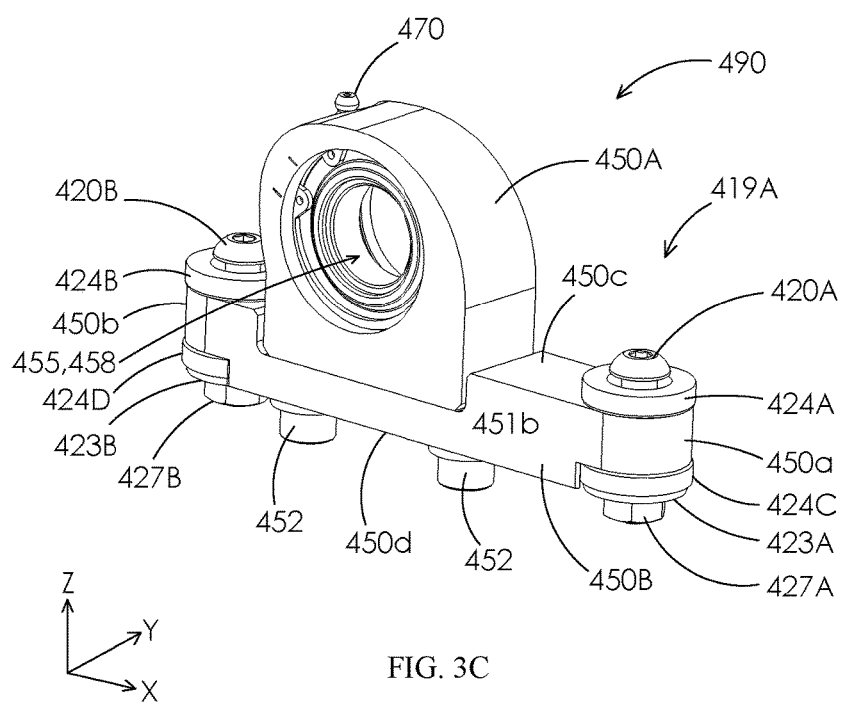

FIG. 3C shows an example of a non-exploded view of the carrier bearing assembly 490, similar to the view of the carrier bearing 490 shown in FIG. 3B, but with the back 451b of the bracket 450 or the carrier bearing assembly 490 oriented towards the viewer instead of the front 451a oriented towards the viewer.

FIG. 3D shows a rear profile view (in the x-z plane) of the carrier bearing assembly 490 similar to the perspective view of FIG. 3C. The bracket 450, or the opening 458 and bearing 71 within the bracket 450, may be substantially offset (e.g., offset by more than 2.5 cm, 2 cm, or 1.5 cm (e.g., 1 in., ¾ in., or ½ in.)) from the lateral midpoint, or to the first side 450a, which is shown to the left in FIG. 3D. In the illustrated example, the distance from center line CL of the opening 455 to the first or left edge 450a may be d1 and the distance from the CL of the opening 455 to the second or right edge 450b may be d2, where d1<d2. In this case, the distance d1 is at least 3 cm, 2.5 cm, 2 cm, or 1.5 cm (1 in., ¾ in., or ½ in.) less than d2, such that the driveshaft of the vehicle will be urged leftward or toward the first or left end 450a by a corresponding, and significant or substantial distance. Additionally, the opening 455 need not be a 90° straight hole (as in the case of prior art designs) that is perpendicular to a first or front face 451a and a centerline of the bracket 450 (shown, e.g., in FIG. 3G). The opening 455 also need not be perpendicular to the second or rear face 451b of the bracket 450, the front face 451a and the rear face 451b being parallel or substantially parallel, such as within less than or equal to 5°. In an embodiment, the opening 455 can be formed by drilling, pressing, broaching, casting, molding, cutting, punching, machining, or other suitable process or method, and extend through the bracket 450 at an angle a such that that 90°<x<95° or 85°<x<90°. Additional detail regarding the angle x is presented with respect to FIGS. 4A and 4B. While the opening 455 is shown being offset in a leftward direction relative to the centerline CL of the carrier bracket 450, it is to be understood that in some instances, the opening 455 may instead be offset in a rightward direction. Furthermore, while the opening 455 is shown as a non-straight hole, it is to be understood that the opening 455 could be formed as a straight hole while the bearing 457 is constructed such that the driveshaft hole 458 of the bearing 457 is formed as a non-straight hole at the angles x described herein.

Accordingly, the carrier bearing assembly 490 can comprise a bracket 450, a mounting structure 419 permitting the bracket 450 to be mounted to a frame 64 of a vehicle, and an opening 455 in the bracket 450 extending through the bracket 450, from a first face 451a of the bracket 450 to a second face 451b of the bracket 450, the opening 455 being substantially offset (e.g., 2.54 cm, or 1 in. or more) in a direction away from a center of the bracket 450. A bearing 457 can be fitted into the opening 455 permitting a driveshaft or driveshaft segment 60 of a vehicle like a UTV, and similar to shaft 40 shown in in FIG. 2, to pass through the opening 455 so that the carrier bearing assembly 490 can substantially constrain movement of the driveshaft 60. Additionally, the opening 455 in the bracket 450 can be formed as a non-straight hole (e.g., not perpendicular, but acute or obtuse to the first or second faces 451a, 451b) allowing the driveshaft 60 to pass through the bearing 457 at a non-perpendicular angle as measured with respect to the bracket 450. In general, the opening 455 can be formed at any angle suitable for reducing vibration and stress on the driveshaft 60, as discussed in greater detail with respect to FIGS. 4A and 4B. The bearing 457 can also contain friction-reducing elements, such as ball or roller bearings. A gap G between the driveshaft 60 and the bearing 457 can be less than about 0.254 mm (0.01 in.) at all times the bearing 457 is coupled to the bracket 450 and the driveshaft 450, including during operation and driving of the vehicle or UTV to which the bracket 450 and driveshaft 60 are attached. The carrier bearing assembly 490 can be constructed of one or more of steel, aluminum, or aluminum composite material, and can further include vibration-damping elements such as a rubber ring, if desired. The carrier bearing assembly 490 permits a substantial correction to at least one operating angle of the driveshaft 60 by constraining the angle of a portion of the driveshaft 60, and is particularly well suited for on/off-road vehicles including UTVs.

The mounting structure 419 can include bolts 420A, 420B and bolt holes 421A, 421B for attaching or bolting the bracket securely to the frame 64 of the vehicle, the at least two bolts 420A, 420B extending through the bracket 450 from the top side 450c of the bracket 450 to the bottom side 450d of the bracket 450 so as to attach the bracket 450 to corresponding mounting holes 66A, 66B in the frame 64, which are shown, e.g., in FIG. 6. The bolts 420A, 420B can be advantageously attached to the mounting holes used by the OEM carrier bearing, such as a conventional carrier bearing 70. The bracket 450 can be mounted to the vehicle chassis 64 in a method that allows a small amount of compliance at each fastening location (bolts 420A, 420B) to account for manufacturing variation among the OEM vehicle frames 64. In an embodiment, stepped bushings 424A/425A and 424B/425B may be used for this purpose.

According to other aspects, a method of adjusting operating angles of a driveshaft 40, 60 in a UTV can comprise (1) removing a first carrier bearing assembly 70 from a driveshaft 40, 60 of a vehicle, the driveshaft 40, 60 having a first set of operating angles; and (2) mounting a second carrier bearing assembly 490 onto the driveshaft, 40, 60 using the same mounting holes 66A, 66B used to secure the first carrier bearing 70, the second carrier bearing assembly 490 permitting the driveshaft 40, 60 to assume a second set of operating angles, the second set of operating angles substantially different from the first set of operating angles. The first carrier assembly 70 can be an OEM or equivalent carrier bearing assembly and the second carrier bearing assembly 490 the novel carrier bearing assembly 490.

In FIG. 3D, the curvature of sides of the upper integrally formed or machined bracket component 450A are shown, in which the angles or sloped sides of the upper component 450A can be seen to distinguish from the vertical sides of carrier-bearing 490. While FIG. 3D shows the zerk 470 disposed towards the second end 450b of the bracket 450, the zerk 470 can also be disposed toward the first end 450 of the bracket 450. Similarly, the zerk 470 can be disposed at any desirable location.

FIG. 3E shows a sectional view of the carrier-bearing 490 taken along the section-line 3E-3E shown in FIG. 3D. FIG. 3E also includes a portion of a driveshaft 60 disposed in the opening 455 of the carrier-bearing 490.

Figure 3F:
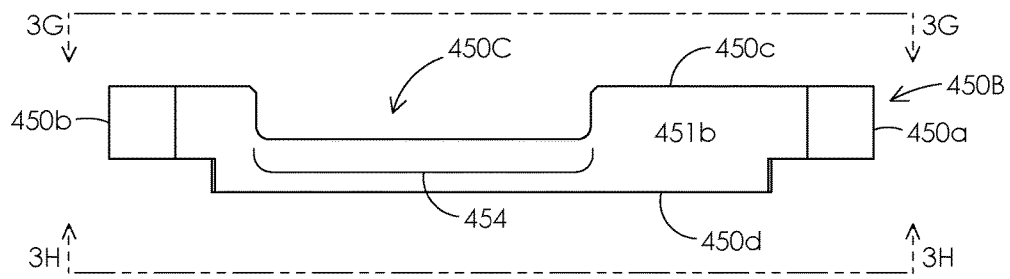
Figure 3G:
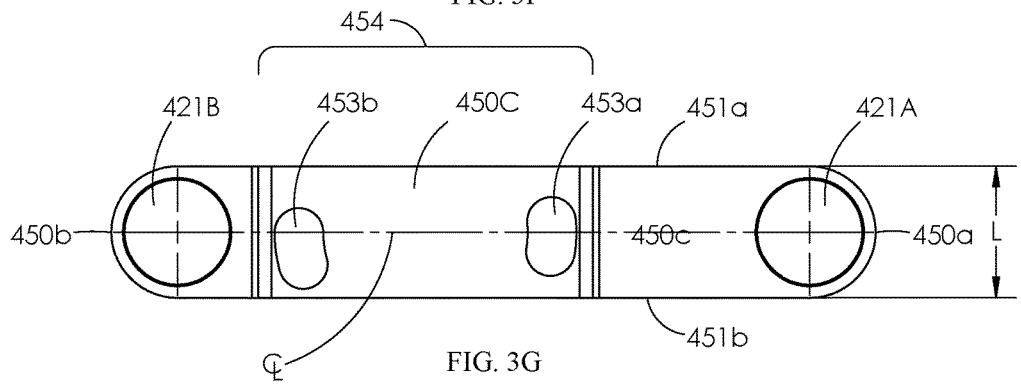
Figure 3H:
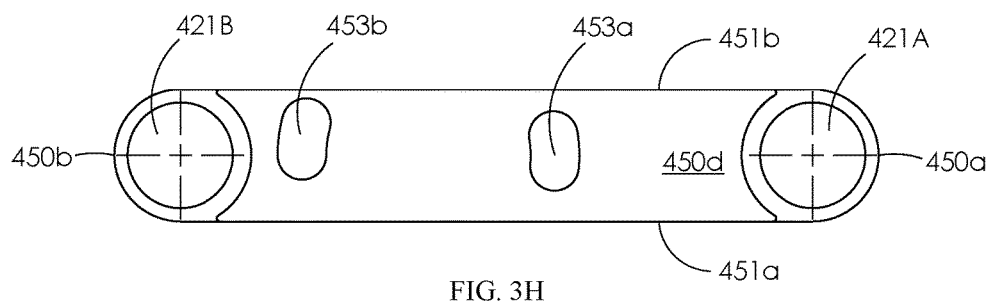

FIGS. 3F-3H shows additional detail of how, in some embodiments, the auto set angle of the carrier bearing assembly 490 can allow for positioning of the bearing 457 (and a centerline $CL_2$ of the bearing 457) at a desired or advantageous angle with respect to the centerline CL of the bracket 450, or the lower bracket component 450B, or the frame 64. The auto set angle of X° may be achieved using existing mounting holes 66A, 66B in the frame 64 to allow for the non-perpendicular auto set angle (such as less than 89° and greater than 91°, or 85-89° or 91-95°) between the centerline CL of the bracket 450 and the centerline $CL_2$ of the bearing 457, which can also align with the driveshaft 60. Thus, the auto set angle x° be set without a need for fixed or desired angles for the bearing 457 to be machined into the bracket 450 or the upper housing 450A. Instead, the desired or relative auto set angle x° can be achieved by at least one opening 453, such as openings 453a and 453b, openings 421A and 421B, or both, being formed as slotted, curved, arced, crescent shaped, or other desirable openings, as shown, e.g., in in FIGS. 3G, 3H, and 5A-5F.

FIG. 3F shows a back profile view of the lower bracket component 450B, similar to the view shown in FIG. 3D, but without, or separate from, the upper bracket component 450A. The lower bracket component 450B comprises an opening or recess 450C that facilitates the reception and coupling of the upper bracket component 450A to the lower bracket component 450B. The recess 450C also comprises a common footprint 454 or a shared/overlapping space or footprint of the upper bracket component 450A and the lower bracket component 450B in the x-y plane.

FIG. 3G shows a plan view of the top side 450c lower bracket component 450B taken along the section line 3G shown in FIG. 3F. FIG. 3G shows the centerline $CL_4$ that may pass through the centers of one or more of the openings 421A, 421B, and the openings 453. FIG. 3G also provides additional detail of the curved or crescent shape of openings 453 can allow the top piece 450A to move, slide, or rotate at an angle relative to the frame 64 and the original bolt holes 66A and 66B in the frame, while being coupled to the lower bracket component 450B with bolts or nuts 427, thereby changing the relative angle between the bearing 457 and the frame 64 or the UTV. In some instances, the slotted openings 453 can be of the same size, shape, or length, while in other instances the openings 453 can be different sizes, shapes, or lengths, such as with the a more elongate opening 453b and a less elongate opening 453a.

FIG. 3H shows a plan view of the bottom side 450d of the lower bracket component 450B taken along the section line 3H shown in FIG. 3F. FIG. 3H provides an opposing view of the additional detail shown in FIG. 3G.

Figure 4A:
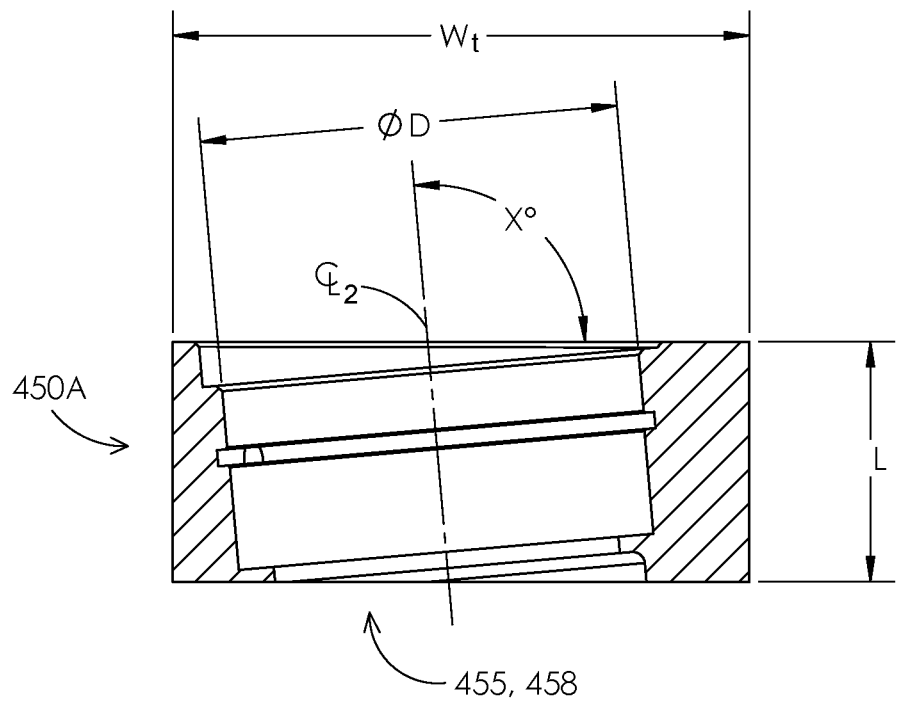
FIGS. 4A-4B illustrate additional views of an embodiment of a carrier bearing assembly.
Figure 4A:
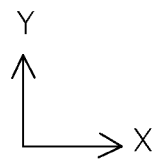
Figure 4B:
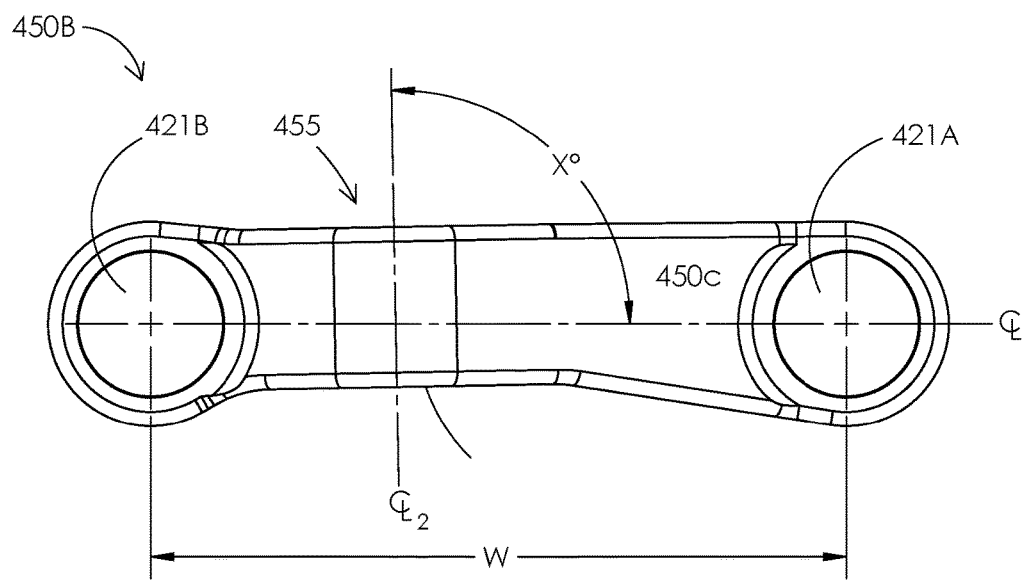

FIGS. 4A and 4B provide additional detail of cross-sectional views. FIG. 4A shows a cross-sectional view of the first bracket component 450A, as shown taken along the section line 4A-4A, shown in FIG. 3D. FIG. 4B shows a non-limiting example of cross-sectional plan or top view of the bracket 450, or of the second bracket component 450B similar to the view shown in FIG. 3G. FIG. 4A shows the centerline $CL_2$ of the opening 455, 458 that passes through the center, and along a length L of the openings 455, 458. As a non-limiting example, a diameter D of the opening 455 in bracket 450 can comprise a distance of about 5.5 cm or 5.525 cm (about 2.2 in., or 2.175 in.), while a smaller diameter of the openings 458 can comprise a distance of about 3.0-3.3 cm. An angle x° can be about 91.5°, which can be beneficial for a 2-seater RZR 1000, wherein the angle x° can be measured between the centerline $CL_2$ of the openings 455 or the opening 458 and the centerline CL of bracket 450 as defined by the centers of bolts or fasteners 420, or the centers of openings 421. In some instances, the angle ° might also be measured with respect to the first face 451*a* or second face 451*b* of the bracket 450 and one or both of the openings 455, 458.

FIG. 4B a non-limiting example of cross-sectional plan or top view of the bracket 450, or of the second bracket component 450B, in the x-y plane, similar to the view shown in FIG. 3G. FIG. 4B shows the centerline CL$_2$ of the opening 455, 458 passing through the center C of the openings 455, 458. FIG. 4B also shows the centerline CL that passes through the center of the bolt holes or openings 421A, 421B, or the centerline of where bolts 420 will be when positioned within openings 421), with the centerline CL intersects with the centerline CL at a non-perpendicular angle x°, such as an angle x° is greater than 90°, in range of 90.1-98°, in range of 90.1-95°, or about 91.5°, or alternatively, is less than 89°, in range of 82-89.9°, in range of 85-89.9°, or about 88.5°. Thus, the angle x° shown in FIG. 3C, can accommodate the shaft 60, while reducing gaps, vibration, wear, and other undesirable results. FIG. 4D also shows an inner width W$_i$ between the center of the openings 421A and 421B that can, without limitation, comprise a distance of about 15 cm or 15.367 cm (about 6 in., or 6.05 in.).

Figure 5A:
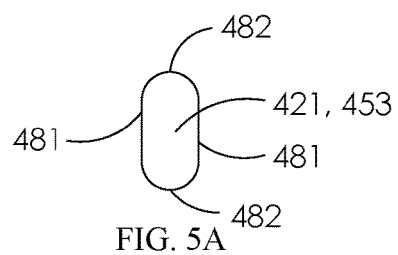
FIGS. 5A-5F illustrate various shapes of openings in a carrier bearing assembly.

FIGS. 5A-5F show a top plan views in the x-y plane, similar to the views shown in FIGS. 3G and 4B, in which various slotted or elongate shapes for the openings 421, 453, or both, are shown. FIG. 5A shows a view in which the openings 421, 453, can comprise an elongated or vertical shape, which can further comprise straight sides 481 extending in a direction of the length L, or in any desirable direction in the x-y plane. The opposing straight sides 481 can also be parallel. The straight sides 481 can be joined by ends 482, which can be flat, straight, curved, or rounded at any desired radius of curvature, and in some instances, may be the same or similar to the radius of curvature of the fasteners or bolts 420, or 542 being disposed within the openings 421, 453. The shape of the openings 421, such as 421A and 421B, or the shape of openings 453, such as openings 453*a* and 453*b* (which is true for any shape, including those shown in FIGS. 5A-5F) can be the same, similar, or different, from each other depending on a desired relative positioning of the carrier bearing assembly 490 with respect to the vehicle frame 60, and the desired angle x°, to accommodate a desired or optimal angle of the shaft 60 through the bracket 450. In some instances, the shape, angle, or position, of the openings 421A, 453*a* can be different from the shape, angle, or position, of the openings 421B, 453*b*, respectively, based, e.g., and a distance or range of motion anticipated in securing the bracket 450 to the frame 64.

Figure 5B:
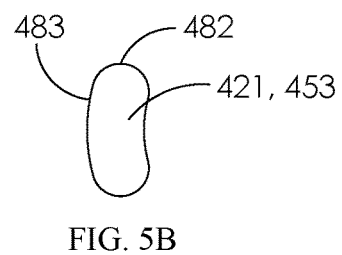

FIG. 5B shows a view in which the openings 421, 453, can comprise an elongated or vertical shape, similar to the shape shown in FIG. 5A. FIG. 5B differs from FIG. 5A in that instead of straight sides 481, the openings 421, 453 comprise curved, sloped, or radiused sides 483, which may or may not also be parallel, and can extend generally in a y-direction along the length L of the bracket 450. The curved sides 483 can be joined by ends 482. The shape of the openings 421, such as 421A and 421B, or the shape of openings 453, such as openings 453*a* and 453*b* can be the same, similar, or different, from each other depending on a desired relative positioning of the carrier bearing assembly 490 with respect to the vehicle frame 60, and the desired angle x°, to accommodate a desired or optimal angle of the shaft 60 through the bracket 450. Slightly different and angled curved openings are shown, e.g., in 3G and 3H.

Figure 5C:
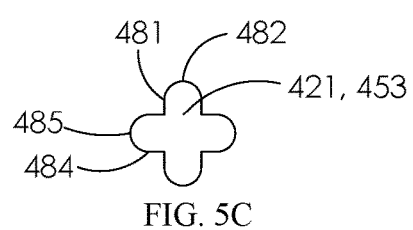

FIG. 5C shows another non-limiting example of the shape of openings 421, 453, which can comprise an elongated or vertical shape, similar to the shapes shown in FIGS. 5A and 5B, but can further comprise a horizontal element comprising sides 484 extending in the x-direction along the width W of the bracket 450, the horizontal side components 484 being connected or joined by ends 485, which can be similar or identical to ends 482. Taken together, the overall shape can be a plus-shape, +shape, or star-shape comprising four or any other number of desired legs or points, such as five, six, or more legs or points.

Figure 5D:
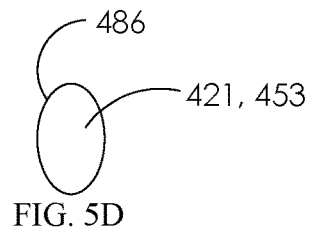

FIG. 5D shows another non-limiting example of the shape of openings 421, 453, which can comprise a rounded, smooth, curved, radiused, oval-shape, 0-shape, or organic perimeter or outer boundary 486. 421, 453, can extend generally in a y-direction along the length L of the bracket 450, with some bias, rotation, or angle in the x-direction to accommodate a desired relative positioning of the carrier bearing assembly 490 with respect to the vehicle frame 60, and the desired angle x°, to accommodate a desired or optimal angle of the shaft 60 through the bracket 450.

Figure 5E:
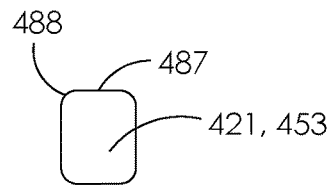

FIG. 5E shows another non-limiting example of the shape of openings 421, 453, which can comprise a square, rectangular, geometric, or polygon shape, which can be formed of generally straight sides 487 and rounded, smooth, curved, or radiused corners where 488, where the sides 484 are joined.

Figure 5F:
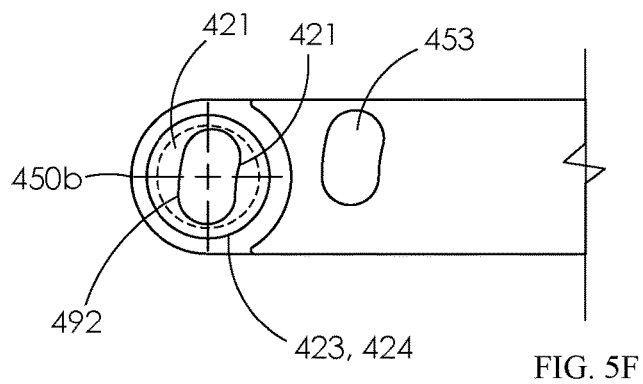

FIG. 5F shows a view of openings 421, 453, formed in the bracket 450, a portion or left portion of which is shown, in a top plan view, similar to the views shown in FIGS. 3G and 4B. FIG. 5F additionally discloses that in addition to an entirety of the opening 421 being formed in any desired shape, an effective, exposed, or functional portion or shape 492 of the opening 421 can be created by making the exposed opening 492 smaller than the opening 421, and defining the exposed opening 491 by a shape, inner portion, or inner diameter of one or more washers 423, or by a shape, inner portion, or inner diameter of one or more bushings 424, or both. Thus, FIG. 5F shows effective opening 492 with an area smaller than, and contained within, the larger area of opening 421, shown as a dashed circle. A smaller of differently shaped effective opening may also be formed for openings 453. In some instances, the openings 421, 453, or the effective openings 492, comprise an area that is larger than an area or cross-sectional area of the bolts or fasteners 420, 452, respectively, that will be disposed within the openings, such as 10-400% larger, 10-200% larger, or about 100%, 50%, or 20% larger.

FIG. 6 shows a carrier bearing assembly, such as carrier bearing assembly 490, or variations thereof, could also be similarly situated on the driveshaft 60. The carrier bearing assembly 490 can then be fastened or bolted to the frame 64 of the UTV, with the openings or bolt holes 421A, 421B aligned with the openings 66A, 66B for the OEM carrier bearing 70 in the frame 64. In some instances, the alignment of the openings or bolt holes 421A, 421B will be directly aligned with the openings 66A, 66B for the OEM carrier bearing 70 without an intermediary members or adapters. In yet other instances, one or more intervening members or adapters can be used to adapt or align the openings or bolt holes 421A, 421B with the openings 66A, 66B for the OEM carrier bearing 70. In yet other instances, the openings or bolt holes 421A, 421B can be aligned with new or custom openings formed in the frame 64, rather than relying on one or more of the openings 66A, 66B for the OEM carrier bearing 70. In some instances, the bolts or fasteners 420 will go directly into the existing openings 66A, 66B for the OEM carrier bearing 70, to reduce an amount of work or customization; and the desired angle x° between the centerline CL$_2$ of the bracket and the centerline CL of the opening or hole 455, 458, will be accommodated by one or more of a size, shape, or position of the openings 421, 453, or the effective openings 492.

As such, and as a non-limiting example, a carrier bearing assembly 490 for attaching to a frame 66 of a UTV may comprise the bracket 450 comprising the first end 450a, the second end 450b, the width W extending between the first end 450a and the second end 450b, a first face 451a extending between the first end 450a and the second end 450b along the width W, and a second face 451b opposite the first face extending between the first end 450a and the second end 450b along the width W of the bracket 450. The opening 455 can be formed completely through the bracket 450 and extend from the first face 451a to the second face 450b. The bearing 457 can be disposed within the opening 455 and the auto set angle x° between the centerline $CL_2$ of the bearing 457 and a centerline CL of the bracket 450 can be in a range of 85-89° or 91-95°. The first mounting structure 419A can be offset from the opening 450 for coupling the carrier bearing assembly to the frame of the UTV. The second mounting structure 419B can be offset from the opening 455 for coupling the carrier bearing assembly to the frame 64 of the UTV. The centerline CL of the bracket 50 can pass through the center 428A of the first mounting structure 419A and a center 428B of the second mounting structure 419B. The auto set angle x° can be determined by at least one slotted opening 421, 453 formed in the bracket 450 such that the centerline of the bearing $CL_2$ moves relative to the centerline CL of the bracket as a position of the mounting structures 419A and 419B move within the at least one slotted opening 421, 453 before being fixedly tightened within the at least one slotted opening 421, 453.

Furthermore, the first mounting structure 419A can comprises a first opening 421A through the bracket 450 and a first bolt 420A disposed through the first opening 421A, the first bolt 420A being adapted to be aligned with a first hole 66A in the frame 64 of the UTV. The second mounting structure 419B comprises a second opening 421B through the bracket 450 and a second bolt 421B disposed through the second opening 420B, the second bolt 421B being adapted to be aligned with a second hole 66B in the frame 64 of the UTV. The center of the first mounting structure 419A can be defined by a center 428A of the first bolt 420A, and the center of the second mounting structure 419B can be defined by a center 428B of the second bolt 420B.

Where the above examples, embodiments and implementations reference examples, it should be understood by those of ordinary skill in the art that other manufacturing devices and examples could be intermixed or substituted with those provided. Accordingly, for example, although particular features may be disclosed, such components may comprise any shape, size, style, type, model, version, class, grade, measurement, concentration, material, weight, quantity, and/or the like consistent with the intended operation of a method and/or system implementation may be used. In places where the description above refers to particular implementations, it should be readily apparent that a number of modifications may be made without departing from the spirit thereof and that these implementations may be applied to other embodiments. Accordingly, the disclosed subject matter is intended to embrace all such alterations, modifications and variations that fall within the spirit and scope of the disclosure and the knowledge of one of ordinary skill in the art.

What is claimed is:

1. A carrier bearing assembly for attaching to a frame of a utility terrain vehicle (UTV), comprising:
   a bracket comprising a first end, a second end, a width extending between the first end and the second end in an x-direction, a first face extending between the first end and the second end along the width, and a second face opposite the first face extending between the first end and the second end along the width of the bracket;
   an opening formed completely through the bracket and extending from the first face to the second face in a y-direction;
   a bearing disposed within the opening and an angle between a centerline of the bearing and a centerline of the bracket being in a range of 85-89° or 91-95°, the bearing directly contacting the bracket;
   a first mounting structure offset from the opening for coupling the carrier bearing assembly to the frame of the UTV; and
   a second mounting structure offset from the opening for coupling the carrier bearing assembly to the frame of the UTV, and
   wherein the centerline of the bracket passes through a center of the first mounting structure and a center of the second mounting structure as viewed in an x-y plane.

2. The carrier bearing assembly of claim 1, wherein:
   the first mounting structure comprises a first opening through the bracket and a first bolt disposed through the first opening, the first bolt being adapted to be aligned with a first hole in the frame of the UTV; and
   the second mounting structure comprises a second opening through the bracket and a second bolt disposed through the second opening, the second bolt being adapted to be aligned with a second hole in the frame of the UTV,
   wherein a center of the first mounting structure is defined by a center of the first bolt as viewed in the x-y plane, and
   wherein a center of the second mounting structure is defined by a center of the second bolt as viewed in the x-y plane.

3. The carrier bearing assembly of claim 2, wherein the first opening of the first mounting structure is formed as a slotted opening.

4. The carrier bearing assembly of claim 3, wherein:
   the slotted opening comprises an elongate, plus, circular, or square shape; and
   a cross-sectional area of the slotted opening is greater than or equal to 1.2 times a cross-sectional area of the first bolt.

5. The carrier bearing assembly of claim 2, wherein:
   the bracket comprises an upper unitary machined bracket component comprising the opening and the bearing; and
   a lower unitary machined bracket component comprising the first opening through the bracket with the first bolt disposed through the first opening, and the second opening through the bracket and the second bolt disposed through the second opening.

6. The carrier bearing assembly of claim 5, wherein a slotted opening is formed in the bracket within a common footprint of the upper unitary machined bracket and the lower unitary machined bracket.

7. The carrier bearing assembly of claim 2, wherein the bracket comprises a machined aluminum bracket.

8. The carrier bearing assembly of claim 1, wherein the carrier bearing is fastened over or under the frame of the UTV.

9. The carrier bearing assembly of claim 1, wherein the angle between the centerline of the bearing and a centerline of the bracket is in a range of 85-88.5° or 91.5-95°.

10. The carrier bearing assembly of claim 9, wherein the bracket comprises a machined aluminum bracket.

11. The carrier bearing assembly of claim 1, wherein the bracket comprises a machined aluminum bracket.

12. A carrier bearing assembly for attaching to a frame of a utility terrain vehicle (UTV), comprising:
   a bracket comprising a first end, a second end, a width extending between the first end and the second end, a first face extending between the first end and the second end along the width, and a second face opposite the first face extending between the first end and the second end along the width of the bracket, the bracket further comprising an upper bracket component coupled to a separate lower bracket component;
   an opening formed completely through the bracket and extending from the first face to the second face;
   a bearing disposed within the opening, the bearing being disposed within the opening without a rubber gasket completely encircling the bearing; and
   at least one mounting structure for coupling the carrier bearing assembly to the frame of the UTV using original bolt holes in the frame of the UTV for receiving a stock carrier bearing assembly;
   wherein the bracket is configured to allow an angle in a range of 85-89° or 91-95° relative to a centerline of the bearing and a centerline of the bracket.

13. The carrier bearing assembly of claim 12, wherein the at least one mounting structure further comprises:
   a first bolt adapted to be aligned with a first hole in the frame of the UTV; and
   a second bolt adapted to be aligned with a second hole in the frame of the UTV,
   wherein a centerline of the bracket passes through a center of the first bolt and a center of the second bolt, as viewed in an x-y plane, such that the angle is measured between a centerline of the bearing and a centerline of the bracket and is in a range of 85°-88.5° or 91.5°-95°.

14. The carrier bearing assembly of claim 13, wherein the upper bracket portion is bolted to the lower bracket portion.

15. The carrier bearing assembly of claim 13, wherein:
   the upper bracket component comprises an upper unitary machined bracket component comprising the opening and the bearing; and
   the lower bracket component comprises a unitary machined bracket component comprising openings through which the first bolt and the second bolt are disposed.

16. The carrier bearing assembly of claim 15, wherein at least one slotted opening is formed within a common footprint of the upper unitary machined bracket and the lower unitary machined bracket.

17. The carrier bearing assembly of claim 13, wherein the bracket comprises a machined aluminum bracket.

18. The carrier bearing assembly of claim 12, wherein a rubber bushing is configured to be disposed between the bracket and the frame of the UTV.

19. The carrier bearing assembly of claim 12, wherein the bracket comprises a machined aluminum bracket.

* * * * *